(12) United States Patent
Hayes-Jacobson et al.

(10) Patent No.: US 6,692,782 B1
(45) Date of Patent: Feb. 17, 2004

(54) FILLED POTATO PRODUCT

(75) Inventors: Susan M. Hayes-Jacobson, Minneapolis, MN (US); Scott D. Peterson, Champlin, MN (US)

(73) Assignee: The Pillsbury Company, Minneapolis, MN (US)

( * ) Notice: Subject to any disclaimer, the term of this patent is extended or adjusted under 35 U.S.C. 154(b) by 168 days.

(21) Appl. No.: 09/648,620

(22) Filed: Aug. 28, 2000

Related U.S. Application Data

(60) Provisional application No. 60/160,327, filed on Oct. 19, 1999.

(51) Int. Cl.[7] .............................................. A23L 1/216
(52) U.S. Cl. ........................ 426/102; 426/138; 426/637
(58) Field of Search ................................. 426/102, 637, 426/282, 138

(56) References Cited

U.S. PATENT DOCUMENTS

| | | | |
|---|---|---|---|
| 2,361,288 A | 10/1944 | Hardy, Jr. | |
| 3,215,094 A | 11/1965 | Oldershaw et al. | |
| 3,589,308 A | 6/1971 | Verhoeven | |
| 3,615,724 A | 10/1971 | Sech | |
| 3,622,355 A | 11/1971 | Beck et al. | |
| 3,761,282 A * | 9/1973 | Shatila | 426/102 X |
| 3,817,141 A | 6/1974 | Simonetti | 83/651 |
| 4,007,292 A | 2/1977 | Shatila et al. | 426/637 |
| 4,156,744 A | 5/1979 | Kiploks et al. | 426/637 |
| 4,276,314 A | 6/1981 | Andersen | 426/272 |
| 4,419,375 A | 12/1983 | Willard et al. | 426/272 |
| 4,455,321 A | 6/1984 | Glabe et al. | 426/549 |
| 4,528,202 A | 7/1985 | Wang et al. | 426/550 |
| 4,567,797 A | 2/1986 | Folk | 83/56 |
| 4,645,675 A | 2/1987 | Wilke | 426/113 |
| 4,772,478 A | 9/1988 | Biegel et al. | 426/241 |
| 4,810,660 A | 3/1989 | Willard | 426/272 |
| 5,163,865 A | 11/1992 | Smith | 452/157 |
| 5,217,739 A | 6/1993 | Sttein et al. | 426/496 |
| 5,342,188 A | 8/1994 | Zimmermann | 425/235 |
| 5,437,215 A | 8/1995 | Hamilton | 83/701 |
| 5,752,423 A | 5/1998 | Rawson | 83/508.3 |
| 5,768,970 A | 6/1998 | Wolf et al. | 83/701 |
| 5,819,615 A | 10/1998 | Dale et al. | 83/13 |
| 5,846,584 A | 12/1998 | Capodieci | 426/238 |
| 5,861,185 A | 1/1999 | Capodieci | 426/238 |
| 5,862,728 A | 1/1999 | Giamello | 83/13 |
| 5,871,783 A | 2/1999 | Capodieci | 425/174.2 |
| 5,891,496 A | 4/1999 | Hannah et al. | 426/102 |
| 6,048,555 A | 4/2000 | Kamper et al. | 426/89 |
| 6,383,535 B1 | 5/2001 | Sheen et al. | 426/102 |
| 6,328,550 B1 | 12/2001 | Sheen et al. | 425/133.1 |
| 6,375,997 B1 | 4/2002 | Sheen et al. | 426/283 |

FOREIGN PATENT DOCUMENTS

| | | |
|---|---|---|
| DE | 197 17 421 A | 10/1998 |
| DE | 197 17 421 | 10/1998 |
| DE | 297 22 691 U | 4/1999 |
| DE | 297 22 691 | 4/1999 |
| EP | 0 036 179 A | 9/1981 |
| EP | 0 321 449 A | 6/1989 |
| EP | 0 935 927 A | 8/1999 |
| GB | 2 245 138 A | 1/1992 |

OTHER PUBLICATIONS

International Search Report PCT/US00/41107.

* cited by examiner

*Primary Examiner*—Arthur L. Corbin
(74) *Attorney, Agent, or Firm*—Kagan Binder, PLLC

(57) ABSTRACT

Potato products that retain shred integrity and that are sufficiently thin to fit into a standard toaster have been produced. In some embodiments, the potato products contain a filling. The potato products contain a network of shredded potatoes that enables the potato products to retain structural integrity during production and further manipulation of the product. Extrusion and sheeting methods are used to obtain potato products that retain the desirable shred integrity. A method and apparatus is provided for simultaneously cutting and crimping individual food items from a filled extruded or sheeted product.

27 Claims, 5 Drawing Sheets

FILLED POTATO PRODUCT

PRIORITY CLAIM

This application claims priority of provisional application Serial No. 60/160,327, filed Oct. 19, 1999.

BACKGROUND OF THE INVENTION

The invention relates to processed potato products, particularly to filled potato products. The invention further relates to processes for making these potato products.

Businesses involved in commercial food production consider the food characteristics such that the food is desirable to a significant number of consumers. While consumers desire food with appealing taste and texture, they also demand food products that are simple and fast to prepare.

A variety of potato starting materials are available and have been used for making commercial potato products for consumption. These starting. materials include diced potatoes, sliced potatoes, potato granules and potato nubbins. The starting materials may be in a number of different forms including fresh, individually quick frozen, blanched or dehydrated. In some processes, a potato dough is made from the potato starting materials. The potato dough can be extruded or sheeted and cut into a desired shape. The potato products made in this manner contain a smooth, mashed potato consistency with few or no particulates.

Shredded potatoes have been used to make hash brown potato products. To make hash brown potato patties, for example, the shredded potatoes can be formed into a patty of desired size. The patty is then fried in edible oil. These hash brown potato patties can have discernable shreds that provide a desirable texture for consumers.

Extrusion processes for the formation of food products offer an efficient and cost effective approach. Extrusion processes, however, necessarily have certain characteristics that suggest the types of products that can be effectively produced. In particular, significant pressure is exerted on the ingredients during extrusion when the food product is moved through a gap. Extrusion processes, thus, are particularly suitable for processing doughy products. Because of the pressures involved, extrusion is generally considered to be unsuitable for production of products that need to retain the piece integrity of fragile starting materials.

Sheeting is an alternative processing approach to extrusion. Sheeting is also an efficient approach for food production. In sheeting processes, significant pressure is exerted on the ingredients as they pass through a gap opening.

SUMMARY OF THE INVENTION

In a first aspect, the invention pertains to a filled potato product comprising a potato composition encasing a filling wherein the potato product is sufficiently thin to fit into a toaster. The potato composition includes dehydrated shredded potatoes that have been rehydrated, a binding agent and a gelling agent that hydrates at cold temperatures and gels at high temperatures.

In a further aspect, the invention pertains to a filled potato product comprising a potato composition encasing a filling wherein the potato product is sufficiently thin to fit into a toaster, the potato composition comprising shredded potatoes that have about 80% water by weight, a binding agent and a gelling agent that hydrates at cold temperatures and gels at high temperatures.

In another aspect, the invention pertains to a method of making a potato product, the method comprising extruding a potato composition having shredded potatoes through a die such that the extruded potato composition maintains shred integrity.

In a further aspect, the invention pertains to a method of making a potato product, the method comprising sheeting a potato composition having shredded potatoes through a gap such that the sheeted potato composition maintains shred integrity.

DETAILED DESCRIPTION OF THE INVENTION

Figure 1A:
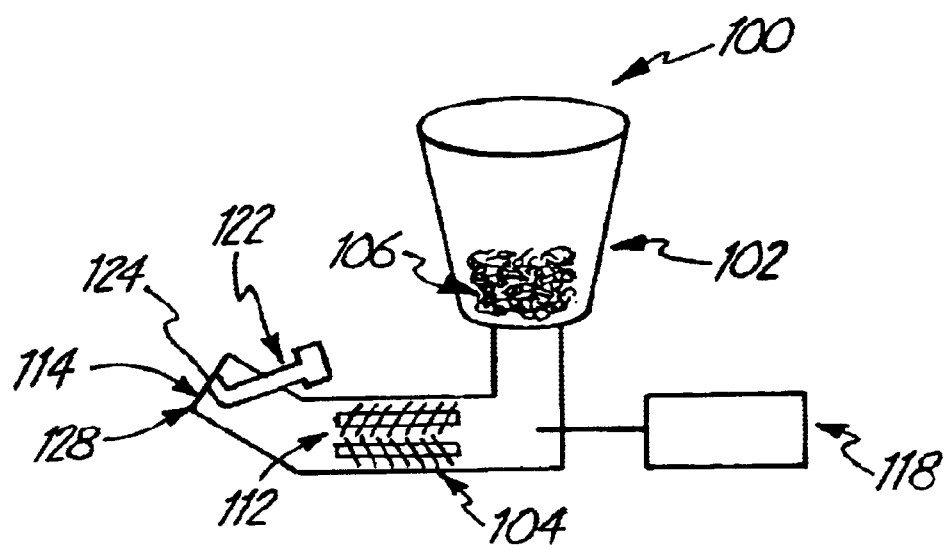
FIG. 1A is a sectional view of the extrusion apparatus where the cross section is taken through the center of the apparatus.

It has been discovered that a potato composition can be extruded through a die or sheeted through a gap between rollers to produce a potato product that maintains the integrity of potato shreds. The potato composition used to make the potato products includes shredded potatoes, binding agent(s), a gelling agent and possibly other optional minor ingredients. A filling can be incorporated into the potato product such that the potato composition surrounds the filling to produce a filled potato product. The potato products are cooked and refrigerated or frozen for consumer use.

The potato products described herein surprisingly maintain discernable potato shreds even when the potato products are produced using protocols that expose the potato composition to significant pressure for example, during extrusion or sheeting. Potato products having a significant quantity of discernable potato shreds are referred to herein as potato products retaining "shred integrity". Generally, the potato composition, after extrusion or sheeting, retains at least about 80% of the potato shreds.

The potato products described herein generally have the "hash brown" type appearance that is desirable by consumers. The surface of the potato products has a hash brown textured appearance resulting from discernable potato shreds. Furthermore, examination of the interior of the potato composition reveals these discernable potato shreds throughout the potato portion of the product. The potato shreds are discernable in the raw product, in the cooked product and even after the customer has reheated the product for consumption.

Retaining shred integrity in the potato products results in a network of shredded potatoes due to intertwining of the intact shreds further held together with the binding agent and the gelling agent. The presence of a network, in turn, aids in maintaining structural integrity of the completed potato products during and following shaping of the product by extrusion or sheeting. The term "structural integrity" as used herein, refers to a potato product that can be handled and prepared using reasonable approaches by the consumer without breaking apart because of such deficiencies as weak seams, filling leakage, sogginess or the like. The potato products described herein preferably maintain structural integrity even upon reheating by the consumer.

Potato products made with the methods described herein have a network of potato shreds that are advantageous in that thinner products that still maintain structural integrity can be made. Thinner products are more amenable for use in toasters and also require shorter heating times to reach desirable internal temperatures for consumption.

The potato compositions that are used to make the potato products described herein include at least shredded potatoes, a binding agent and a gelling agent. The binding agent and the gelling agent in the potato compositions help hold the shredded potatoes together and form a network of potato shreds. The gelling agent generally hydrates at cold temperatures and gels during cooking. Preferable gelling agents hydrate at a temperature between about 40° F. and about 60° F.

Suitable starting forms of the shredded potatoes in the potato compositions include fresh, individually quick frozen (IQF) or dehydrated forms. The starting form of the shredded potatoes may need to be further processed to obtain shredded potatoes with a resilient texture that are amenable for retaining shred integrity upon extrusion or sheeting. Shredded potatoes with the resilient texture are suitable for mixing with the binding agent and the gelling agent to form the potato composition.

Filled potato products can be made using the potato compositions described herein. The filled potato products include a potato composition that encases a filling. The potato composition surrounds the filling such that the filling does not leak out during further manipulations of the filled potato product. Further manipulations can include, for example, drying, freezing, storing, thawing and reheating, as described further below. The potato compositions of the filled potato products also retain shred integrity and have a network of potato shreds, as discussed above. The shredded potato network combined with the binding agent and gelling agent maintain the structural integrity of the filled potato products such that the filling is retained within the walls of the potato composition.

The potato products described herein are generally made using an extrusion process or a sheeting process. Due to pressures needed to extrude or sheet dense potato compositions, potato products made by extrusion or sheeting processes generally have a smooth or mashed potato type consistency. In contrast, the potato products described herein retain shred integrity even when extruded or sheeted to thin layers. Proper selection and treatment of the starting potato materials and extrusion and sheeting conditions contribute to the maintenance of shred integrity.

The starting form of the shredded potatoes used in this process can be appropriately treated to obtain shredded potatoes that have a resilient texture. The resiliency of the potato shreds may provide additional flexibility suitable for maintaining shred integrity during the extrusion and sheeting process. The suitably prepared potato shreds are mixed with a binding agent and a gelling agent and extruded through a die under moderate pressure or sheeted through a gap.

The raw processed product is generally cut and optionally crimped for filled products, and then cooked. In some embodiments, the raw products are cooked by frying in edible oil. Although the potato products are suitable for eating at this point, the potato products are generally refrigerated or frozen for distribution to consumers.

The potato products described herein may be reheated in a variety of ways including frying, baking or toasting. Consumers at home may prefer the ease of toasting the potato products. The structural integrity and thinness of selected embodiments of the potato products made by this process are particularly advantageous, especially with regard to the toastability.

Potato Composition

The potato compositions used to make the potato products of the invention include shredded potatoes, a binding agent, a gelling agent and other optional ingredients, such as flavorings, color enhancers and preservatives. The potato compositions generally contain between about 80% by weight and about 95% by weight of hydrated shredded potatoes, preferably between about 85% by weight and about 95% by weight of hydrated potatoes and more preferably between about 88% and about 95% by weight of hydrated shredded potatoes.

The amount of shredded potatoes in the potato composition generally is optimized to provide a shredded potato network in the extruded or sheeted potato product. The amount of shredded potatoes can be limited by the quantity of binding agents and gelling agents necessary to bind the potato composition to obtain a desirable potato product.

Shredded potatoes generally refer to a collection of potato pieces in which at least about 45 percent of the pieces have a length greater than or equal to about 0.25 inches. Preferably at least about 50% of the pieces have a length greater than or equal to about 0.25 inches and more preferably at least about 55% of the pieces have a length greater than or equal to about 0.25 inches. The desired range for the length of the shredded potatoes can be between about 0.125 inches to about 1.5 inches, preferably between about 0.2 inches to about 1.4 inches and more preferably between about 0.25 inches to about 1.25 inches.

As the length of the potato shreds increases, problems can arise with clogging of the die during extrusion. Inappropriately long potato shreds can bend over and double in thickness leading to clogging and generating voids in the processed potato products due to incomplete extrusion through the die. Sheeting processes generally are not as sensitive to inappropriately long potato shreds.

Potato products with pieces that are shorter in length than about 0.125 inches may not form the desired network of shredded potatoes on a macro scale. Without the network of shredded potatoes, the potato products may not have the flexibility, texture and/or appearance of the desired product. Thus, with a large fraction of the potato shreds falling outside the desired range, the structural integrity of the resulting potato product, especially the filled potato product, may be compromised.

The potato shreds described herein are long enough to form a shredded potato network that assists in maintaining the structural integrity of the potato products. These potato shreds also produce a bumpy surface texture on the potato product. This bumpy surface texture is desirable in a commercial product because it is similar to familiar products produced by other methods.

The width of the shredded potatoes in the potato composition can be generally between about 0.06 inches and about 0.2 inches. The thickness of the shredded potatoes in the potato composition can be generally between about 0.05 inches and about 0.085 inches. Shredded potatoes that are inappropriately thick can clog the extrusion apparatus. In addition, inappropriately thick shredded potatoes can result in sheeted potato composition that is inappropriately thick for making desirable potato products. Shredded potatoes that are inappropriately thin can degrade during blending and sheeting resulting in a loss of integrity, and too much flexibility of the potato product.

The water content of the shredded potatoes with the resilient texture can be less than or equal to fresh potatoes which have a water content of about 80% by weight. Generally the water content of the shredded potatoes with the resilient texture is about 80% by weight or lower, preferably the water content is between about 75% by weight and about 80% by weight. Reduced water content in the potato composition is advantageous for several reasons. Generally, as the water content in the raw potato product is reduced, less oil is absorbed when fried. The lower oil absorption of a potato product reduced oil drip upon reheating. Low oil drip is especially advantageous for toaster reheating.

Shredded potatoes appropriate for making the potato products can be formed from several alternative starting forms. Suitable starting forms of shredded potatoes include, for example, dehydrated shredded potatoes, freshly shredded potatoes or IQF shredded potatoes. The starting form of shredded potatoes may then be further processed to obtain shredded potatoes with a proper resilient texture for forming a potato composition for extrusion and sheeting. The starting form of the shredded potatoes generally determines the manner in which the shredded potatoes are further processed to obtain the shredded potatoes with the desired resilient texture.

In preferred embodiments, dehydrated shredded potatoes are the starting form of shredded potatoes. The starting form of dehydrated shredded potatoes are partially rehydrated to form shredded potatoes with a resilient texture for use in the potato composition. Dehydrated shredded potatoes are similar in appearance and textural hardness to dried pasta. The enzymes in the dehydrated shredded potatoes are inactive, thus reducing the propensity of the partially rehydrated shredded potatoes to develop a brownish color prior to further heat processing.

Dehydrated shredded potatoes that are suitable as a starting form of shredded potatoes can be made using a variety of protocols. One method of making dehydrated potatoes includes the steps, sequentially, of shredding, blanching, cooling, and then drying the potatoes. Dehydrated shredded potatoes made by this method will be referred to herein as "type A" dehydrated shredded potatoes. Dehydrated shredded potatoes made in this manner tend to have low levels of surface starch and hydrate faster during rehydration. In addition, the type A dehydrated shredded potatoes can have good particulate integrity after rehydration. Type A shredded potatoes, due to the low levels of surface starch, can reduce the stickiness of the potato composition. When using only type A shredded potatoes in the potato composition, a good shredded network may be obtained by increasing the levels of the binding agents and gelling agents.

A second method for making dehydrated shredded potatoes includes the steps, sequentially, of cooking, cooling, cooking, cooling, shredding and then drying the potatoes. These dehydrated shredded potatoes will be referred to herein as "type B" dehydrated shredded potatoes. Dehydrated shredded potatoes made in this manner tend to have a high level of surface starch and are very sticky due to the double cooking procedure and shredding after the cook step. Type B shredded potatoes thus, have good patty-forming characteristics. Type B shredded potatoes are less able to maintain particulate integrity after rehydration, than type A shredded potatoes. The use of only type B shredded potatoes may result in a potato product that has an undesirable dense or mashed potato-like texture due to lack of particulate integrity. Both type A and type B shredded potatoes can be obtained, for example, from Nonpareil, Blackfoot, Id. Suitable shredded potatoes with characteristics similar to type A and type B shredded potatoes may be obtained from other sources.

Dehydrated shredded potatoes prepared by a variety of methods can be used as the starting form of shredded potatoes. Combinations of dehydrated shredded potatoes made by different methods may also be used. In preferred embodiments, a combination of type A and type B dehydrated shredded potatoes are used as the starting form of shredded potatoes. The amount of type A dehydrated shredded potatoes is preferably between about 25% by weight and about 75% by weight, more preferably between about 40% by weight and about 60% by weight. The amount of type B dehydrated shredded potatoes is preferably between about 75% by weight and about 25% by weight, more preferably between about 60% by weight and about 40% by weight. A combination of about equal amounts by weight of type A and type B dehydrated shredded potatoes is preferable in some embodiments.

To prepare the dehydrated shredded potatoes for use in the potato composition, the dehydrated shredded potatoes generally are partially rehydrated. Protocols for rehydration are described below. Partial rehydration of the potato shreds may result in a outer layer that is more hydrated than the inner core. The interior of the individual rehydrated shred contains relatively less moisture than the outer layer due to a diffusion controlled hydration rate. The difference in the moisture content of the outer layer relative to the inner core is advantageous for obtaining shredded potatoes with the resilient texture that maintain their integrity upon extrusion or sheeting. As discussed above, shredded potatoes with resilient texture result in potato products that better retain shred integrity during the extrusion or sheeting process.

The starting form of shredded potatoes may also be fresh shredded potatoes. Fresh shredded potatoes are generally partially blanched and cooled prior to use in a potato composition. Fresh shredded potatoes that are fully blanched may be too soft to maintain their shred integrity during the extrusion process. Generally the fully blanched shredded potatoes are cooked for longer periods of time than the partially blanched shredded potatoes. The partially blanched shredded potatoes can still acquire the desired resilient texture necessary for retaining shred integrity during extrusion and sheeting.

The fresh potatoes generally contain active enzymes, thus, care must be taken to avoid browning of the potatoes in the potato composition. The browning of the potatoes can be reduced by partially or fully blanching the shredded potatoes. Alternatively, a browning inhibitor may be added to the shredded potatoes.

The starting form of shredded potatoes may also be IQF shredded potatoes. IQF shredded potatoes may be prepared using methods described for fresh shredded potatoes above. IQF shredded potatoes are generally fully blanched prior to being frozen. Prior to forming the potato composition, the frozen IQF shredded potatoes are thawed. The thawed IQF shredded potatoes are then mixed with a binding agent and a gelling agent to form the potato composition.

The potato compositions for extrusion or sheeting generally include between about 1 percent by weight to about 15 percent by weight of binding agent, preferably between about 3 percent by weight to about 12 percent by weight, and more preferably between about 5 percent by weight to about 10 percent by weight. The binding agent(s) along with the gelling agent included in the potato compositions help hold the shredded potatoes with a resilient texture together to form a network of shredded potatoes. Shredded potatoes, as described above, are generally mixed with the binding agent and gelling agent prior to placing the potato composition into an extruder or sheeter.

A variety of binding agents are suitable for use in the potato compositions described herein. Suitable binding agents include, for example, potato flakes, potato granules, flour, dextrin, starches, and combinations thereof. Suitable flours include for example, potato flour, rice flour, wheat flour, corn flour and the like. Suitable dextrins can include dextrins derived from wheat, corn, tapioca, rice and the like.

Starches include, for example, cook-up starches and pregelatinized starches. Starches can contribute to the stickiness of the potato composition. The stickiness of a potato composition can be significant for maintaining the shredded potatoes in an intertwined network providing the desirable shredded network. Suitable pregelatinized starches include, for example, modified potato starch and modified dent corn starch. Modified potato starch can be, for example, Paselli P obtained from Avebe Corp. in Holland. Modified dent corn starch can be, for example, Miragel 463 obtained from A. E. Staley, Decatur, Ill.

In preferred embodiments, a combination of binding agents is used. A particularly preferred combination of binding agents includes potato flakes, potato flour, tapioca dextrin and the Paselli P modified potato starch. More preferably about 4% by weight of potato flakes, about 1.5% to about 2.5% by weight of dextrin, and about 1% by weight of potato starch are used as binding agents.

The potato compositions also include gelling agents that hydrate at low temperatures and gel at high temperatures. The gelling agents that are suitable generally hydrate below about 60° F., preferably below about 50° F. Suitable gelling agents can gel at cooking temperatures to further aid in maintaining the network of shredded potatoes. The gelling agents can also facilitate in building viscosity of the potato composition as well as reduce oil absorption during frying. Suitable gelling agents include, for example, methyl celluloses. Methocellulose A4C and Methocellulose A40M obtained from Dow Chemical, Midland, Mich. are preferable gelling agents in some embodiments.

Additional, optional, ingredients in the potato composition include for example, emulsifiers, flavorings, color enhancers, browning inhibitors and preservatives. Emulsifiers can moderate the stickiness of free starch and build viscosity during frying. Suitable emulsifiers include, for example, xanthan gum, guar gum, locust bean gum, mono- and diglycerides of fatty acids, propylene glyco mono and diesters of fatty acids, glycerol-lacto esters of fatty acids, ethoxylated mono- and diglycerides, lethicin protein, and mixtures thereof. Preferred emulsifiers include distilled monoglycerides such as Dimodan SDMT-K obtained from Danisco Ingredients USA, Inc. N. Century, KS and Myvatex MIGHTY SOFT made by Quest International, Hoffman Estates, Ill.

Examples of flavorings include sodium chloride and potassium chloride, spices and vanilla. If a flavoring is used, the potato composition includes between about 0.1% by weight and about 2% by weight of flavoring. Preferably, the potato composition includes between about 0.2% by weight and about of 1.7% by weight of flavoring. More preferable, the potato composition includes between about 0.5% by weight and about 1.5% by weight of flavoring.

The potato composition may also include color enhancers. It is desirable that the potato products described herein following frying are a desirable golden brown color. Suitable color enhancers include dextrose, maltose, lactose, galactose and the like. The use of dextrose as the color enhancer is preferable.

The potato composition generally includes less than about 2% by weight of a color enhancer, and more preferably the composition includes about 0.3% by weight to about 0.7% by weight of color enhancer. Even more preferable is a potato composition having about 0.4% by weight of color enhancer.

The potato composition may also include preservatives and browning inhibitors. Suitable preservatives include, for example, anti-oxidants such as BHT. Suitable browning inhibitors may include sodium bisulfate, ascorbic acid and the like.

Filling

A variety of fillings can be used to make the filled potato products. The filling includes raw and/or cooked food products. The filling and/or ingredients of the filling can be previously frozen and subsequently thawed and/or cooked. The filling can have a uniform consistency or a chunky consistency. In preferred embodiments, the filling is a highly viscous liquid, suspension or a flowable mixture of particulates and/or liquid that may not normally be a liquid or a suspension. The filling composition preferably is highly viscous such that it will not flow immediately through any imperfection in the potato composition or out from the ends or seams of the potato product during or prior to cutting and crimping of the filled potato material after exiting the extruder. Extrudable or pumpable fillings are particularly preferable. Suitable fillings for the potato products herein include fillings described in U.S. Pat. No. 5,932,276 which is incorporated herein by reference.

While the filling can have a high or intermediate water activity, it is preferable that the filling have a reduced water activity for improved toastability. Preferably the water activity of the filling is between about 0.85 and about 0.95, more preferably between about 0.90 and 0.93.

In filled potato products, it is desirable to have the water activity of the potato composition be about the same as the water activity of the filling in order to lessen water migration. Alternatively, if the water activities are different, it is desirable to have the water activity of the potato composition be greater than the water activity of the filling so that the water migrates from the potato composition to the filling. A filling that retains its taste and textural characteristics in the event of water migration from the potato composition to the filling is preferable. Excessive water migration from the potato composition to the filling however, may result in a filling that is runny and less desirable. Water migration from the filling to the potato composition may result in a soggy interface between the potato composition and the filling following reheating. Reduced water activity in the filling also results in a potato product that heats more quickly.

The filling can be made from any type or types of food ingredients, including meat ingredients, vegetable ingredients, dairy ingredients, egg products, fruit ingredients, nuts, spices, flavorings, fats, and the like. The filling can further include, for example, preservatives and property modifiers, such as emulsifiers, thickening agents, and low molecular weight compounds such as salt and glycerin.

Particularly suitable fillings for potato products include, for example, cheese, cheese sauce, bacon, sausage, ham, ketchup, eggs, peppers, onions, spices and combinations thereof. The filling may comprise one ingredient or a combination of ingredients. Examples of combination fillings include cheese/bacon and cheese/peppers.

Preparation of the Potato Composition

The potato products described herein are generally made using an extrusion or sheeting process. Shredded potatoes in a variety of starting forms can be used in these processes. In some embodiments, the starting forms of shredded potatoes are dehydrated shredded potatoes, freshly shredded potatoes or IQF shredded potatoes. Other starting forms of shredded potatoes may also be used.

The starting forms of the shredded potatoes used in this process can be appropriately treated to obtain shredded potatoes for extrusion or sheeting with preferable properties. The preferable shredded potatoes generally have a resilient texture. Potato shreds generally have the resilient texture when the moisture level in the interior of the potato shreds is lower than or at about the same moisture level as the exterior of the potato shreds. The resilient texture of the potato shreds can provide additional flexibility to retain shred integrity during the extrusion or sheeting process. Shred integrity, in turn, aids in forming a shredded potato network that is advantageous in this invention. The shredded potato network can enable the formation of a thinner product due to the increase in flexibility and durability.

In some embodiments, the starting form of shredded potatoes preferably are dehydrated shredded potatoes. The dehydrated shredded potatoes generally are further treated to obtain shredded potatoes with a resilient texture that are suitable for mixing with the binding agent and the gelling agent. The dehydrated shredded potatoes generally are partially rehydrated to obtain the desirable resilient texture.

Selection of the appropriate rate and temperature of rehydration is important for obtaining the appropriately hydrated shredded potatoes. The extent of hydration is dependent on the temperature of the added water used for hydration, length of exposure to the added water and the amount of the added water present.

As the temperature of the added water increases, the rate of hydration increases. The dehydrated potato shreds can be hydrated in water that has an initial temperature between about 120° F. and about 1 75° F. Preferably, the initial temperature of the water is between about 135° F. and about 165° F. More preferably the initial temperature of the water is about 150° F. Rehydration with water at initial temperatures above 170° F. may lead to loss of integrity of the shreds and loss of the resilient texture in the shreds.

Generally, procedures using potatoes are not conducted between 60° F. and 120° F. due to microbiological contamination concerns. Potatoes may contain bacteria, such as *Bacillus cereus*, that produce toxins at temperatures between about 60° F. and about 120° F. Thus, manipulating potatoes in this temperature range is not recommended. Potatoes may be transitioned from below 60° F. to above 120° F. or vice versa by either rapid heating or quick cooling, respectively.

The amount of added water for hydrating the dehydrated shredded potatoes generally is at an added water:potato ratio between about 2.5:1 by weight to about 4:1 by weight. Preferably, the added water:potato ratio is between about 3.1:1 by weight to about 3.8:1 by weight. More preferably, the added water:potato ratio is about 3.4:1 by weight. This results in a desired degree of partial hydration of the dehydrated potato shreds in terms of sensory and processing resilience. An added water to potato ratio of greater than about 4:1 can result in a shred network that is too soft and lead to degradation of the potato shreds. Alternatively, insufficient hydration can result in shreds that are leathery and chewy in the final product.

The appropriate amount of water at the preferred temperature can be substantially absorbed by the potato shreds between about 10 minutes and about 20 minutes. Preferably, the potato shreds are hydrated for about 12 minutes. Hydration times of longer than about 20 minutes can negatively affect the resilient texture of shredded potatoes because the potatoes are still at a relatively high temperature and continue to soften and absorb any remaining surface moisture over time.

The potato shreds can be gently mixed or tossed during the hydration in order for the potato shreds to be evenly hydrated. Generally the shredded potatoes are enclosed in the mixing compartment. The mixing compartment however, does not have to be sealed. Suitable mixers include for example, a horizontal bar mixer or paddle mixer such as a Forberg mixer with dual paddles obtained from Forberg AS, Norway. Generally, the water is substantially absorbed by the potato shreds during hydration. There may, however, be some residual water on the surface of the potato shreds due to relatively short hydration times.

The hydrated potato shreds are generally quick cooled. It is preferable that the hydrated potato shreds do not remain at high temperatures after the partial hydration procedure. During hydration, some additional gelatinization of the starch in the potato shreds may occur due to use of hot water. This may result in softening and loss of particulate definition as well as noticeable dryness in sheeting or extrusion. This dryness may create a poorer extrusion or sheet that is more fragile and prone to cracking. Quick cooling generally slows the cooking process and can aid in avoiding bacterial growth. Quick cooling thus, maintains the resilient texture of the hydrated shreds.

The hydrated potato shreds are generally quick cooled to below about 50° F. It has been observed that cooling to temperatures above 50° F. can result in a mixture that is too sticky and hard to handle. Preferably, the potato shreds are cooled to temperatures between about 38° F. to about 45° F. Cooling to below 38° F. may affect the hydration of the potato shreds. The potato shreds, after quick cooling, generally retain shred integrity during extrusion or sheeting processes.

Quick cooling can be performed in a variety of ways including for example, passing through a chiller, injecting a gas that envelopes the hydrated potato shreds and the like. Quick cooling of the potatoes can also be performed by adding pulverized dry ice to the hydrated potato shreds as long as it can be adequately mixed. A suitable chiller can be an evaporative chiller. Injection of nitrogen or carbon dioxide gas may also be appropriate for cooling.

When freshly shredded potatoes are used as the starting form, the sliced or slabbed fresh potatoes can be partially blanched to inactivate some of the browning enzymes and partially soften the uncooked potato texture. A browning inhibitor may be added to the partially blanched fresh potatoes. The blanched fresh potatoes are then quick cooled using an air chiller or water prior to addition of the binding and gelling agents.

When IQF shredded potatoes are used as the starting form, the IQF potatoes are generally fully thawed. The thawed IQF potatoes are then combined with the binding or gelling agents.

Binding agent(s) and gelling agents are added to the cooled potato shreds with the resilient texture to hold the potato shreds together. In the absence of binding and gelling agents, the potato shreds are incapable of forming a network of shredded potatoes that is particularly advantageous in the present process. After addition of the binding agent(s) and gelling agent, the composition is mixed just until all the dry components are appropriately dispersed. Extensive mixing is generally not carried out because particulate identity may be reduced. Suitable mixers can include a paddle mixer, a ribbon blender and a horizontal bar blender. In preferred embodiments, a Forberg paddle mixer from Forberg AS in Norway is used. Generally, the components of the potato composition are added to the mixer and mixed for about one to about two minutes. The potato composition at this point is generally very sticky. In addition to binding agents, flavorings, color enhancers and preservatives may be added to the potato composition and mixed.

Food Extruders

The potato products described herein can be made using an extrusion process. An extrusion process involves the application of pressure against the potato composition to force the potato composition through a die. The extrusion can be performed using a variety of extruders or pumping systems. Suitable extruders include conventional food extruders that operate at low to moderate pressures. The extruders generally extrude the potato products between about 5 psig and about 500 psig. Suitable extruders include a Vemag twin screw extruder such as a Vemag Robot HP10C/1 extruder.

Extruders and pumps generally involve one or more screws that are rotated to propel the composition toward the die. The extruder can include sections with multiple screws and other sections with a single screw. If there is more than one screw, rotation of the screw mixes the composition as well as propels the dough forward. Generally, the screw is surrounded by a barrel that holds the composition under pressure as it moves toward the die. In general, the higher the extrusion or pump pressure, the greater the degradation of the shreds. The extruder does not necessarily need a screw, and other implements such as paddles, lobes or vanes can be used to move the composition and to force the composition through the die under pressure.

The die, generally, includes an outer orifice 116 through which the potato composition exits and an inner orifice 117 through which the filling exits. Preferably, the orifice is sized such that the extrudate, when cut and possibly flattened, can fit into a standard pop-up toaster.

If the potato product is intended to have a filling, a tubular outlet of a filling tube can be located in the center of the potato die orifice. The filling can be dispensed from the tubular outlet opening such that the potato composition, pushed through the outer die which surrounds the tubular outlet, forms around the filling as the filling flows from the tubular outlet. In some embodiments, the thickness of the potato composition pushed through the outer die is between about 0.17 inches and about 0.25 inches, preferably between about 0.18 inches and about 0.23 inches. The die opening may, be in the shape of a rectangle, an elongated oval, a circle or the like.

In some preferred embodiments potato product is shaped to fit into a standard pop-up toaster. In these embodiments, the die generates an appropriately sized slab or filled potato composition that can fit within a toaster. The slab may be rectangular, circular or any other shape that can fit in the toaster. Alternatively, shapes that are larger than the slots of the standard pop-up toaster are also within the scope of this invention.

Referring to FIG. 1, an embodiment of a suitable food extruder 100 is depicted schematically. The potato composition 106 is supplied through hopper 102 into extruder barrel 104. A screw drive 112 is located within extrusion chamber 104 to propel the potato composition through extrusion chamber 104 toward die 114. Die 114 has an orifice at extruder head 128. Screw 112 is rotated by motor 118. The rotation speed of the screw(s) correlates with the retention time of the potato composition within the extruder barrel 104. Screw 112 can include a single screw or the like, or multiple screws. The extruder can have a section with multiple screws that feeds into a section with a single screw.

Figure 1B:
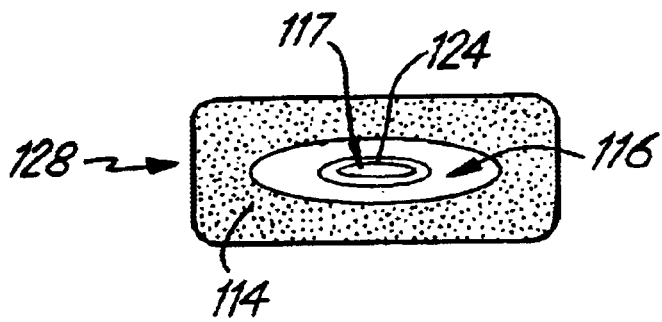
FIG. 1B is a front view of a die at extrusion head of the extruder of FIG. 1A.

Extruder 100 can optionally include a filling depositor 122. Filling depositor 122 generally includes a tubular outlet 124. Die 114 preferably also includes a tubular outlet 124 as shown in FIG. 1B. The filling is expelled from tubular outlet 124 at the orifice 117 of die 114. The potato composition is forced under pressure out of the outer orifice 116 but around the tubular outlet 124. Other types of die openings can be selected to produce the desired shape of the potato products.

Extrusion of the Potato Composition

The potato compositions in this invention are extruded to produce the potato products described herein. The mixed potato composition is introduced into the hopper of the extruder. An extrusion process involves the application of pressure against the potato composition either through rotation of screws, lobes or vanes to force the composition through a die to form the desired shape. The hopper can also include a rotating feed screw as well as vacuum to better fill the extruder.

The details of the extrusion process generally will depend on the particular features of the extrusion apparatus. Particular extrusion parameters suitable for the processes described herein are specified in Example 2. Potato products without filling may be extruded as flat sheets and cut into the desired shape and size.

Filled potato products can be extruded using a variety of dies. The filling is generally dispensed intermittently in order to place the desired amount in each cut product with space for cutting. In other words, the extrudate is cut between portions of filling such that the filling is located within the cut portions.

Dies that make flat sheets can be used. A flat sheet of the potato composition can serve as the bottom layer. Filling can be added at the appropriate spots. A flat sheet of the potato composition can then be placed on top of the filling to produce a filled potato product. The potato product is then cut, if necessary, and crimped.

In preferred embodiments, the filling is coextruded with the potato composition. In these embodiments, the extruder is equipped with a filling pump or depositor, such that the potato composition reaching the die surrounds a filling and forms a coextrusion. In preferred embodiments, the filling is coextruded with the potato composition. The relative amounts of filling and potato composition can be adjusted by the relative speed of the extruder screw and the flow rate of the filling. When a filling is used, a structure of potato composition surrounding the filling exits from the die during the extrusion process. The shape and size of the extrudate depends on the shape and size of the die. The filled extrudate can be cut to a desired length and crimped to secure the filling within the potato composition. It has been found that cutting on its own does not seal the filling within the potato composition. Crimping is required to seal the composition against leakage. As the thickness of the extrudate decreases, the product becomes more amenable for toaster reheating. The extrudate may be flattened to produce a toaster-sized product.

The extrudates generally are fairly deformable and sticky. The extrudates, generally, are immediately placed on a solid support such as a conveyor belt. Suitable solid supports can include metal surfaces, plastic surfaces, non-stick surfaces such as Teflon (trademark of DuPont) or any other coated belting material. The solid support may be a conveyor belt that is positioned adjacent to the extruder such that the extrudates are deposited on the conveyor belt. The extrudates may be moved away from the die on the conveyor belt in order to be cut and crimped.

Preferred approaches for cutting and crimping the extrudate account for the stickiness of the extrudate. During the cutting and crimping, the extrudate can be damaged because the potato product sticks to cutting or crimping devices. In preferred embodiments, an ultrasonic cutting/crimping device is used. An ultrasonic device can prevent the potato composition from sticking to the cutter/crimper blade of the device. This prevents damage to the extrudates during the cutting and crimping steps due to sticking and potato build up.

Figure 2:
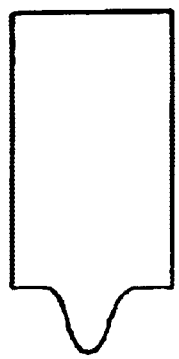
FIG. 2 is a profile view of a cutter/crimper wheel built into the ultrasonic horn of the ultrasonic device.

A standard profile of a cutter/crimper blade is shown in FIG. 2. The cutter/crimper blade is fashioned as a part of the ultrasonic "horn" of an ultrasonic device. The ultrasonic device applies a high frequency vibration to the "horn" so that sticky materials are not able to remain on the surface of the cutter/crimper blade. Ultrasonic devices and horns can be obtained, for example, from Dukane Corp., St. Charles, Ill.

Cutting and crimping devices may be adjacent to the extruder such that the extrudate is cut and crimped on a support such as a conveyer belt (preferably immediately) after it exits the extruder. Alternatively, cutting and crimping can be performed a substantial distance downstream of the extruder, if desired. The extruder may have cutting and crimping devices attached to the extruder. In some embodiments, the cutting and crimping may be performed by an individual holding a hand held device. It has been found to be generally preferable to cook the product shortly after it has undergone the above described processing.

Sheeting Apparatus

The potato products described herein can also be made by using a sheeting process. A sheeting process involves feeding the potato composition into a set of rollers that are separated by a gap. Pressure develops on the potato composition briefly as it travels between the rollers and through the gap between two rollers. In sheeting processes, pressure on the potato composition can be short in duration but moderate at a given moment. The sheeting can be performed using a variety of sheeting apparatus as long as a cutter is present for removing the sheeted potato composition from the roller. Suitable sheeting apparatus include conventional sheeting apparatus that operate at low to moderate pressures. The sheeting apparatus generally sheet potato compositions between about 5 psig and about 200 psig. Suitable sheeting apparatus include a Rykaart three roll sheeter model 3RS obtained from Rykaart in Holland.

Sheeting apparatus generally includes two or more rollers. The rollers are generally spaced to contain a gap, optionally adjustable, between them through which the potato composition can travel. The rollers generally rotate in opposing directions in order for the potato composition to be fed into the gap and then rolled out of the gap in a sheeted form.

The sheeting apparatus can include a hopper and at least two, preferably three rollers in the apparatus. If the sheeting apparatus includes only two rollers, the hopper generally contains a compaction device. The compaction device can be a paddle or a rotating device that packs the potato composition and removes some of the air voids in the potato composition at or before entrance into the gap between the two rollers to prevent bridging or incomplete filling of the width of the roller.

Figure 3:
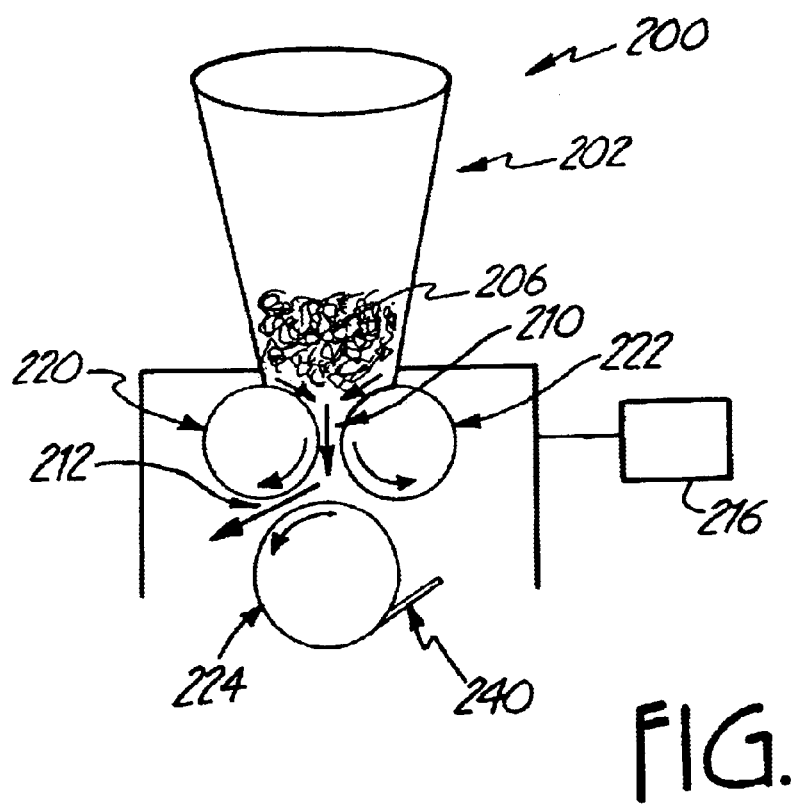
FIG. 3 is a sectional view of the sheeting apparatus where the cross section is taken through the center of the apparatus.

A three roller sheeting apparatus generally contains two rollers on top and a third roller at the bottom that is approximately centered between the top two rollers as shown in FIG. 3. If the sheeting apparatus includes three rollers, feeding the potato composition through the first gap, between the first set of rollers, can pack the potato composition by filling the empty spaces. The packed potato composition can then be fed into a second gap between the lower roll and one of the two upper rollers. The potato composition is sheeted as it is rolled through and out of the second gap.

The gap setting between the rollers in a two roller apparatus or the second set of rollers in a three roller apparatus can be between about 2 millimeters and about 8 millimeters, preferably between about 3 millimeters and about 6 millimeters, and more preferably between about 4 millimeters and about 5 millimeters.

Referring to FIG. 3, an embodiment of a sheeting apparatus 200 is depicted schematically. The potato composition 206 is supplied through hopper 202 into gap 210 between rollers 220 and 222. Roller 220 can be a corrugated roller. Rotation of the rollers 220 and 222 in the indicated direction packs the potato composition and propels the potato composition toward gap 212 between rollers 222 and 224. Rollers 220, 222, and 224 are rotated by motor 216. The rotation speed of the rollers 220, 222 and 224 correlates with the speed of material exiting the sheeter.

The sheeting apparatus preferably includes a doctor blade 240. The doctor blade 240 peels the sheeted potato composition off the rollers 224. The doctor blade abuts the roller so it can scrape the potato composition off the roller.

Sheeting of the Potato Composition

As noted above, the potato compositions described herein can be sheeted and used to produce the potato products described herein. The potato composition can be introduced into the hopper of the sheeting apparatus. A sheeting process involves directing the potato composition towards a gap and rolling the potato composition through the gap to form a sheet structure of consistent thickness. Protocols for making a filled potato product can involve two sheet structures, a bottom sheet and a top sheet. The filling can be placed on the bottom sheet and then overlaid with the top sheet. The combined composition can be appropriately crimped and cut.

The details of the sheeting process generally will depend on the particular features of the sheeting apparatus. Particular sheeting parameters suitable for the processes described herein are specified in detail in Example 3.

Potato products without filling may be sheeted and cut into the desired shape and size. The thickness of the potato product is generally appropriate for fitting into a standard pop-up toaster. The thickness of the potato products can be appropriately adjusted so that the potato products can be reheated in a toaster without becoming limp and floppy.

Filled potato products can be made using two sheeted compositions, a top sheet and a bottom sheet. Two different sheets of the potato composition can be used for the top and bottom sheets. Alternatively, one sheet can be generated and then cut down the center to make two sheets. One half can be used as the top sheet and the other half can be used as the bottom sheet.

A sheeted composition can be made with a batch of the potato composition. The thickness of a sheet of the potato composition preferably is between about 3 millimeters and about 6 millimeters, more preferably about 4.8 millimeters. The sheet can be placed on a flat surface as it is exiting the sheeting apparatus and removed from the rollers by a peeling mechanism, for example, a doctor blade. Preferably, the flat surface is a conveyor belt.

The filling can then be placed on the sheeted potato composition that is the bottom sheet. Aliquots of filling can generally, be spot-deposited on the bottom sheet. Generally, appropriate space is present between the aliquots of filling for cutting and crimping the potato product. Filling may be deposited by any one of a number of well-known depositors. After the filling has been deposited, the top sheet can be placed on the bottom sheet containing the filling. The bottom sheet is preferably about the same size as the top sheet. The combined potato compositions with the filling between them can then be crimped and cut.

If two different sheets are used as the top and bottom sheets, a second sheeting apparatus, similar to the first, may be used. The second sheeting apparatus may be placed, for example, next to the conveyor belt downstream from the filling depositor. The top sheet can be generated, peeled off the rollers and placed on the bottom sheet over the filling as it is moving down the conveyor belt.

Crimping and cutting can include side crimping, end crimping, side cutting and/or side slitting to form the ends and sides of the raw filled potato product. Suitable implements for side crimping and cutting may, include rotary wheels. Suitable implements for end crimping may include a crimping bar. Suitable implements for end cutting may include rotating cross cutting blades or stamping cutters. End crimps and end cuts are generally placed between filling deposits. It is to be understood, however, that in the preferred practice of the present invention, the end crimp and cut is performed in one step.

The thickness of the filled potato products made by extrusion or sheeting methods described herein is generally between about 11 millimeters and about 18 millimeters, preferably between about 14 millimeters and about 17 millimeters. The width of the potato products described herein is generally between about 2.0 inches and about 3.0 inches, preferably between about 2.4 inches and about 2.6 inches. The length of the potato products described herein is generally between about 3.0 inches and about 4.5 inches, preferably between about 3.3 inches and about 3.8 inches.

Processing of the Raw Potato Product

To complete the processing, the filled potato product can be cooked or partially cooked by baking, boiling, frying or microwave cooking the potato product after it exits the extruder or sheeter. Preferably, the potato product is fried. Rather than cooking the filled potato product immediately following the extrusion or sheeting process, the potato product can be refrigerated or frozen prior to cooking.

After the product is cooked, it can be eaten, if desired, or stored. Storage generally involves refrigeration or freezing of the product. Refrigerated or frozen dough products can be stored for reasonable periods of time based on the storage temperatures. The refrigerated or frozen product can be reheated prior to eating, if desired. During the distribution of a frozen potato product, the product may be subject to temporary temperature abuse that will result in the product experiencing one or more thawing and refreezing cycles.

The frozen or refrigerated potato product can be packaged for distribution to the consumer. Any suitable packaging can be used including conventional packaging. The consumer generally reheats the potato product, by baking, frying, toasting or microwave heating with a metallized susceptor. It has been discovered that the potato products of the extrusion or sheeting process, described herein, are particularly amenable to toaster reheating. Toaster cooking is a desirable approach from a consumer perspective due to convenience and speed. Toaster reheating may performed by heating in one, preferably two cycles. The reheating is generally performed between about 3 minutes and about 6 minutes. After reheating, the internal temperature of the potato product is generally between about 120° F. and about 150° F.

EXAMPLES

Example 1

Preparation of the Potato Composition

This example illustrates a method for preparing a potato composition using dehydrated shredded potatoes.

Table 1 indicates the amounts of the various ingredients used to produce a batch of about 50 pounds of the potato composition.

| Ingredients | Weight (lbs.) | Weight Percent |
| --- | --- | --- |
| Dry Ingredients | | |
| Potato flakes | 2 | 4.0 |
| Methocellulose A40M | 0.125 | 0.25 |
| Methocellulose A4C | 0.125 | 0.25 |
| Dist. Monoglyceride | 0.25 | 0.5 |
| tapioca dextrin 11 | 0.75 | 1.5 |
| dextrose | 0.2 | 0.4 |
| salt | 0.5 | 1.0 |
| PaselliP potato starch | 0.5 | 1.0 |
| Total of dry ingredients | 4.45 | 8.9 |
| Potatoes | | |
| Dehyd. Shreds RD149-A | 5.175 | 10.30 |
| Dehyd. Shreds RD1049-B | 5.175 | 10.30 |
| 150° water** | 35.2 | 70.4 |
| Total of potatoes | 45.55 | 91.10 |

**Rehydration ratio is about 3.4 parts added water to 1 part dried potato.

The dehydrated potatoes were hydrated in the indicated amount of hot water that was at 150° F. The shredded potatoes were hydrated in the hot water for about 12 minutes. After the hydration was completed, approximately, 10–15 pounds of pulverized dry ice was added to the hydrated potatoes and quick cooled to about 45° F.

To the hydrated potatoes, the dry ingredients indicated in Table 1 were added. This composition was then mixed in a mixer between about 1 minute to about 2 minutes. A horizontal bar mixer obtained from Oshikiri in Japan was used. The resulting potato composition was sticky. The temperature of the potato composition was maintained between about 40° F. and about 50° F.

Example 2

Extrusion of the Potato Composition

This example illustrates an extrusion method using the potato composition described in Example 1 to produce a filled potato product.

The potato composition of Example 1 is loaded into the hopper of a Vemag Robot HP10C/1 extruder and extruded. An oval, tubular die that generates a potato composition crust with a thickness of about 0.172 inches was used. A continuous potato composition was extruded using a slight vacuum in the feed hopper. The potato composition was extruded at a rate of about 3 pounds per minute to about 4 pounds per minute. A filling was intermittently coextruded within the potato composition.

Each extrudate was end crimped and cut simultaneously using an ultrasonic crimping/cutting device.

Example 3

Sheeting of the Potato Composition

This example illustrates a sheeting method of using the potato composition described in Example 1 to produce a filled potato product.

The potato composition described in Example 1 is loaded into the hopper of a Rykaart three roll sheeter. A gap setting of about 3.8 millimeter was used resulting in a potato composition sheet with a thickness of about 4.3 millimeters.

Two sheets were generated using the above described gap settings. Filling was spot-deposited at the appropriate spots on one of the sheets of potato composition. The other sheet of potato composition was overlaid on the sheet with the filling. This combined composition was then side crimped and cut as well as end cut using an ultrasonic crimping/cutting device.

After sheeting is accomplished with the apparatus shown in FIG. 3, the filled product is cut and crimped or sealed to a desired width and length, preferably with a 10 lane configuration to produce up to 1500 pieces per minute.

Side-Seam Cutting and Crimping

Figure 4:
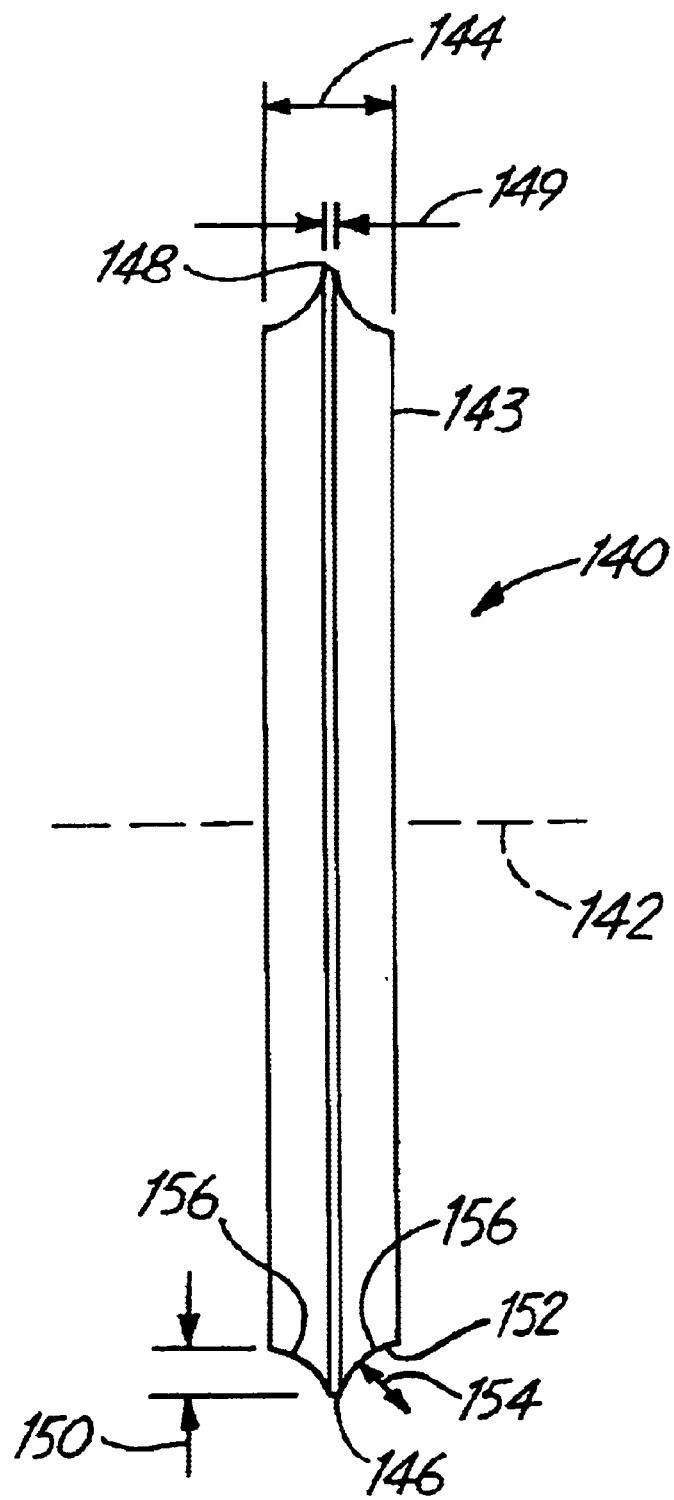
FIG. 4 is a side profile view of a rotary side-seam cutter and crimper wheel useful in the practice of the present invention.

Referring now to FIG. 4, a rotary side-seam cutting and crimping wheel 140 may be seen. Wheel 140 is preferably mounted to be rotatingly driven about axis 142. Wheel 140 preferably has a body 143 with an overall thickness 144 of 0.500 inches. Wheel 140 also has a circumferentially extending centrally located rim 146 with a cutting edge 148 having a thickness 149 preferably of 0.030 inches. The cutting edge 148 of rim 146 preferably projects a distance 150 of 0.400 inches from body 143. A concave profile 152 having a radius 154 of preferably 0.500 inches forms a pair of crimping shoulders 156 on each side of the cutting edge 148 of rim 146.

Side cutting and crimping is preferably the first step after sheeting the product into a continuous multi-layer component with intermittent filling deposits. Cut product sizes are the same as the cutter blade spacing. There is no snapback to deal with. The side cutting and crimping is performed in a single action using rotary wheels 140 preferably spaced on 2.5 inch center, and keyed to an independently driven common shaft. Each wheel 140 is machined to match the profile of FIG. 4 to allow a single step of cutting and crimping to seal adjacent product sides with contoured edges. It is to be understood, however, that ultrasonics are generally not required for side cutting and crimping.

The side cutting and crimping wheels are preferably driven at a speed about 10 to about 20 percent faster than the product conveying speed upstream and in the side cutting and crimping area. This speed differential, along with the minimal area in contact between the wheel and the product, has been found to provide a self-cleaning action for the side cutting and crimping wheels, in addition to providing a desired product width for the individual lanes for the food items being formed from the sheeted material.

End Cutting and Crimping

After side cutting and crimping, the ends of the sheeted product are cut and crimped in a single step fashion using a guillotine style system. The two axis guillotine system is preferably located immediately downstream of the side-seam cutting and crimping wheels. The two degrees of freedom of the guillotine system are vertically up and down and horizontally upstream and downstream of the sheeted product flow. The guillotine system has one or more cutting and crimping blades supported by a movable framework or walking cutter synchronized to the flow of the sheeted product. The y-axis vertical movement provides the necessary cutting and crimping action while the x-axis horizontal movement provides the timing for proper finished food item length. The end cut and crimp is located between filling deposits, preferably at 3.5 inch intervals, which provides a desired food item length and sufficient sheet overhang for end sealing of the leading and trailing edges of successive food items formed from the sheeted product assembled upstream.

Figure 5:
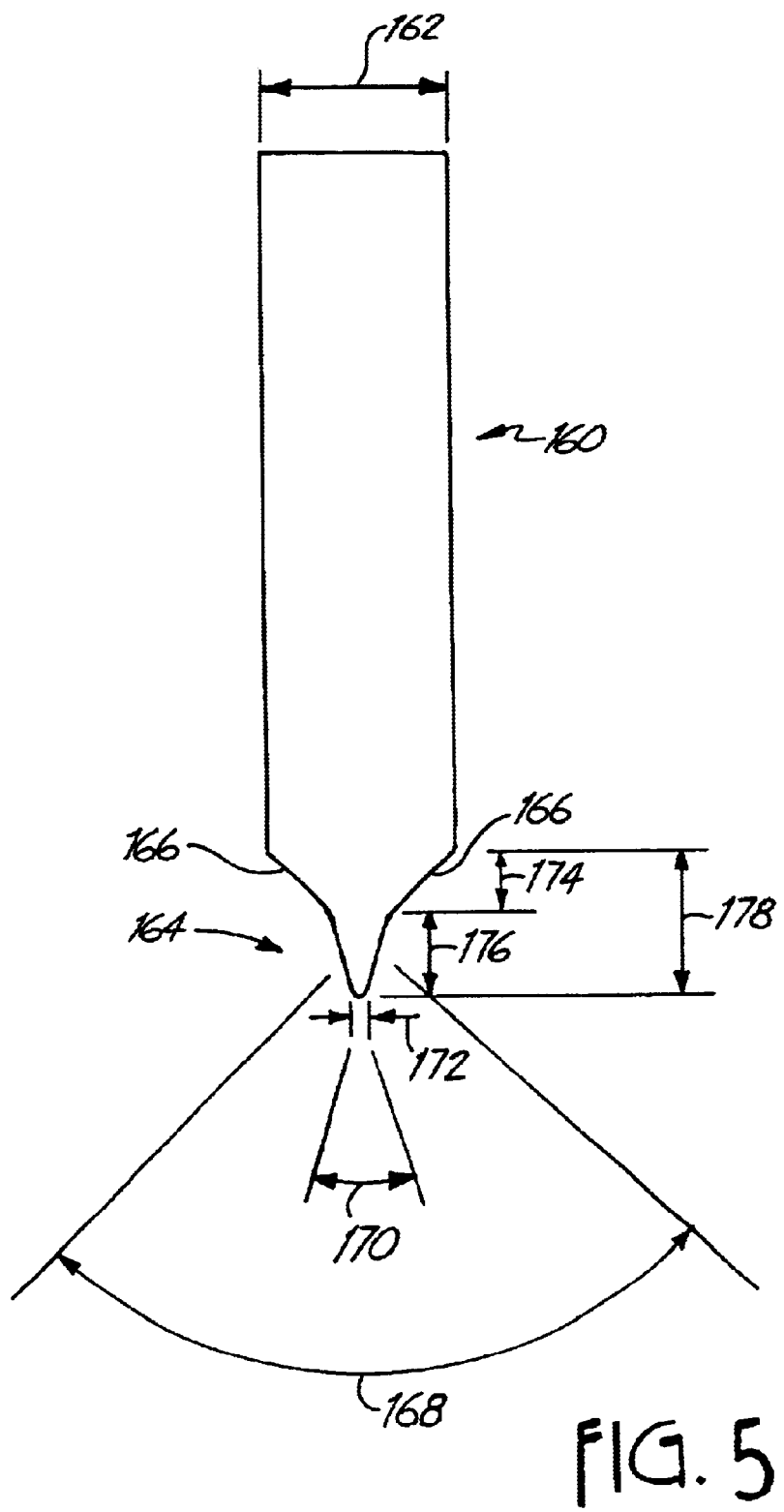
FIG. 5 is a side profile view of an end crimper and cutter blade useful in the practice of the present invention.
Figure 6:
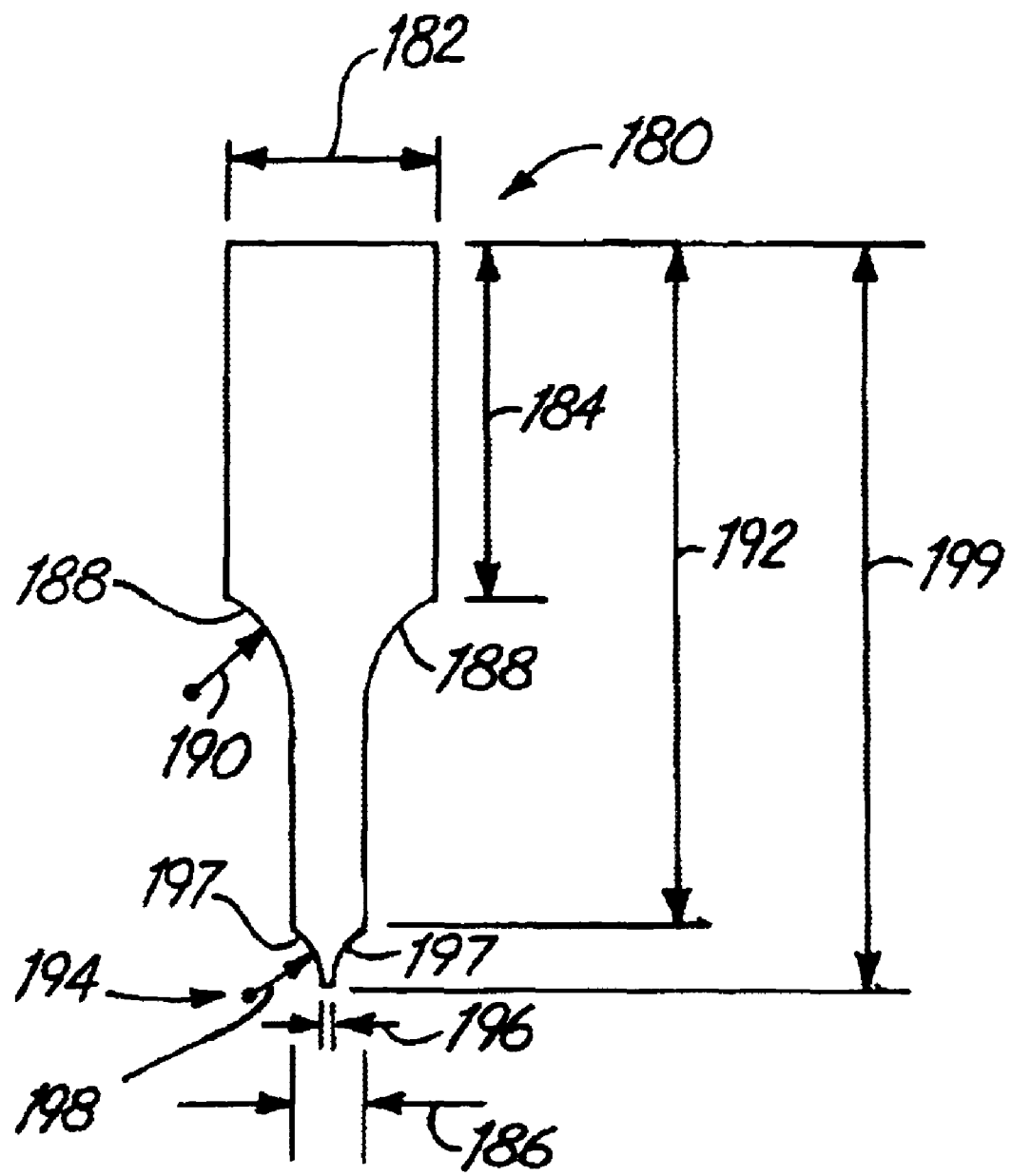
FIG. 6 is a side profile view of an ultrasonic cutter and crimper blade useful in the practice of the present invention.

Referring now most particularly to FIG. 5, a cutter profile for ultrasonically-assisted cutting and crimping may be seen. The cutting and crimping blade for the end cut and crimp operation is preferably one or more flat bars, arranged to span the entire sheeted product, and machined to a desired contour or shape, two preferred forms of which are shown respectively in FIGS. 5 and 6. The desired profile will have an edge or tip portion for cutting and a shoulder portion for crimping. The end cutter and crimper preferably operates on a 3.5 inch spacing, to result in a finished food product 3.5 inches long. In FIG. 5, the end crimper and cutter blade 160 has a thickness 162 of 0.500 inches, and a projecting tip 164 formed by a pair of angled shoulders 166 each having a first included angle 168 of about 90 degrees and a second included angle 170 of about 30 degrees. Tip width 172 is preferably 0.030 inches and the angled shoulders 166 each have a first section length 174 of 0.175 inches and a second section length 176 of 0.225 inches, to make an overall length 178 of 0.400 inches for shoulder 166. In FIG. 6, an end cutting and crimping blade 180 preferably has a main body width 182 of 1.25 inches, a main body length 184 of 2.625 inches, and a narrower working portion width 186, which may be variable. The main body tapers to the working portion with a pair of shoulders 188 formed at a radius 190 of 1.25 inches. The length 192 of the main body portion and the working portion together is 5.000 inches, and a tip 194 having a width 196 of 0.030 inches is formed by a pair of concave shoulders 197, each having a radius 198 of 0.500 inches. The overall length 199 of the main body, working portion and tip is preferably 5.400 inches.

Since the present sheeting materials do not exhibit elastic retraction to any significant degree upon cutting and crimping (unlike dough products, which typically will elastically retract when cut), an independent, variable speed diverging conveyor is preferably used downstream of the end cutting and crimping apparatus to increase spacing between individual food items in both longitudinal (downstream) and transverse (cross-stream) directions.

The vertical or y-axis stroke of the end cutting and crimping blade must be adjusted to completely cut through the product, but not damage the underlying product conveying belt. Because the potato shreds have not been completely hydrated, they are somewhat rubbery and require a relatively pointed blade to obtain a good cut. In addition, the timing of the vertical axis stroke including penetration into and retraction from the product desirably will occur as rapidly as possible to minimize product buildup on the surface of the end cutting and crimping blade. The horizontal and vertical movements are timed to cycle sufficiently rapidly to provide the desired production rate and correct product lengths. The material of the end cutting and crimping blade (and that of the side cutting and crimping wheel) is preferably stainless steel for ease of cleaning, and to maintain sanitary conditions.

One supplier for the ultrasonic driver for the end cutting and crimping blade is Dukane Ultrasonics of St. Charles, Ill. The ultrasonic equipment includes a generator and a cutting and crimping blade according to either FIG. 5 or 6 attached to an ultrasonic transducer. It is to be understood, that as shown, the configuration of FIG. 6 has been used for manually controlled cutting and crimping; however, such a configuration may be automated in the same manner as that described with respect to FIG. 5. The ultrasonic generator preferably produces a continuous ultrasonic signal (preferably at about 20 KHz) to the transducer which transforms this signal to a mechanical vibration at that frequency to oscillate the tip 194.

To span a 10 lane wide sheeted product line with a 2.5 inch transverse dimension for the individual food items, it is preferable to use 3 generators, 3 transducers and three end cutting and crimping blades as the "horns" for the ultrasonic system, with each blade preferably about 9 inches long. The ultrasonically driven blades would be operated in the walking cutter arrangement described above.

It can thus be seen that the method of processing a filled comestible product of the type having a sticky outer surface of exterior material (such as potato shreds) includes forming the product in a continuous longitudinal direction having filling material portions located longitudinally intermittently interior of the exterior material, and simultaneously transversely cutting and crimping the exterior material intermediate (in between) the portions of the filling material. The simultaneous cutting and crimping is accomplished by urging an ultrasonically vibrated blade against the sticky material. The blade has a narrow cutting portion and a pair of crimping shoulders on each side of the cutting portion. This end cutting and crimping can be used with either extruded or sheet formed products.

Although the present invention has been described with reference to preferred embodiments, workers skilled in the art will recognize that changes may be made in form and detail without departing from the spirit and scope of the invention.

What is claimed is:

1. A filled potato product comprising a potato composition encasing a filling wherein the potato product is sufficiently thin to fit into a toaster, the potato composition comprising dehydrated shredded potatoes that have been rehydrated, a binding agent and a gelling agent that hydrates at cold temperatures and gels at high temperatures.

2. The potato product of claim 1 wherein the shredded potatoes, the binding agent and the gelling component form a network that retains the filling upon cooking and reheating.

3. The potato product of claim 1, wherein the dehydrated shredded potatoes that have been rehydrated comprise about 77% by weight added water.

4. The potato product of claim 1, wherein the length of at least about 45% of the shredded potatoes in is at least about 0.25 inches.

5. The potato product of claim 1, wherein the length of at least about 55% of the shredded potatoes in is at least about 0.25 inches.

6. The potato product of claim 1, wherein the length of the shredded potatoes is in the range between about 0.125 inches and about 1.5 inches.

7. The potato product of claim 1, wherein the length of the shredded potatoes is in the range between about 0.2 inches and about 1.4 inches.

8. The potato product of claim 1, wherein the thickness of at least about 45% of the shredded potatoes is between about 0.05 inches and about 0.085 inches.

9. The potato product of claim 1, wherein the binding agent is selected from the group consisting of potato flakes, flour, dextrin, starch and mixtures thereof.

10. The potato product of claim 1, wherein the potato composition comprises between about 1% by weight and about 15% by weight of the binding agent.

11. The potato product of claim 1, wherein the potato composition comprises between about 3% by weight and about 12% by weight of the binding agent.

12. The potato product of claim 1, wherein the gelling agent is a methyl cellulose.

13. The potato product of claim 1, wherein the potato composition comprises between about 0.2% by weight and about 1% by weight of the gelling agent.

14. The potato product of claim 1, wherein the potato composition further comprises a flavoring.

15. The potato product of claim 14, wherein the flavoring is selected from the group consisting of sodium chloride, potassium chloride, potato flavoring and mixtures thereof.

16. The potato product of claim 1, wherein the potato composition further comprises a color enhancer.

17. The potato product of claim 16, wherein the color enhancer is a reducing sugar.

18. The potato product of claim 16, wherein the color enhancer is dextrose.

19. The potato product of claim 1, wherein the filling is selected from the group consisting of egg products, dairy products, meat products and mixtures thereof.

20. The potato product of claim 1, wherein the thickness of the potato product is between about 11 millimeters and about 18 millimeters.

21. The potato product of claim 20, wherein the thickness of the potato product is between about 14 millimeters and about 16 millimeters.

22. A filled potato product comprising a potato composition encasing a filling wherein the potato product is sufficiently thin to fit into a toaster, the potato composition comprising shredded potatoes that have about 80% water by weight, a binding agent and a gelling agent that hydrates at cold temperatures and gels at high temperatures.

23. The potato product of claim 22, wherein the shredded potatoes are freshly shredded potatoes.

24. The potato product of claim 22, wherein the shredded potatoes are individually quick frozen shredded potatoes.

25. The potato product of claim 22, wherein the length of at least about 45% of the shredded potatoes in the population of shredded potatoes is at least about 0.25 inches.

26. The potato product of claim 22, wherein the filling is selected from the group consisting of egg products, dairy products, meat products and mixtures thereof.

27. The potato product of claim 22, wherein the thickness of the potato product is between about 11 millimeters and about 18 millimeters.

* * * * *